United States Patent

Feeney et al.

(12) United States Patent
(10) Patent No.: US 6,735,635 B1
(45) Date of Patent: May 11, 2004

(54) DYNAMIC PREAMBLE CONFIGURATION ON A SHARED BUS

(75) Inventors: James William Feeney, Endicott, NY (US); Jorge R. Rodriquez, Cary, NC (US); Edward Stanley Suffern, Chapel Hill, NC (US); Robert William Bartoldus, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/574,753

(22) Filed: May 18, 2000

(51) Int. Cl.⁷ .............................................. G06F 15/16
(52) U.S. Cl. .................. 709/248; 709/249; 709/250; 709/253; 370/445; 370/447; 370/510
(58) Field of Search .............................. 709/227, 228, 709/213, 214, 248, 249, 250, 251–253; 370/444, 447, 445, 446, 509, 510

(56) References Cited

U.S. PATENT DOCUMENTS

| | | | |
|---|---|---|---|
| 4,907,224 A | * 3/1990 | Scoles et al. ................ 370/443 |
| 5,185,860 A | 2/1993 | Wu | |
| 5,193,151 A | 3/1993 | Jain | |
| 5,278,992 A | * 1/1994 | Su et al. ......................... 455/69 |
| 5,378,067 A | * 1/1995 | Severson et al. ............ 709/237 |
| 5,734,833 A | * 3/1998 | Chiu et al. ................... 709/225 |
| 5,740,174 A | * 4/1998 | Somer ......................... 370/402 |
| 5,768,543 A | * 6/1998 | Hiles ........................... 710/107 |
| 5,844,900 A | * 12/1998 | Hong et al. ................. 370/342 |
| 5,968,132 A | 10/1999 | Tokunaga et al. | |
| 6,256,317 B1 | * 7/2001 | Holloway et al. ........... 370/447 |

* cited by examiner

Primary Examiner—Dung C. Dinh
Assistant Examiner—Yasin Barqadle
(74) Attorney, Agent, or Firm—Bracewell & Patterson LLP (57) ABSTRACT

A method and system for adjusting a message preamble on a shared bus, wherein the message preamble includes N synchronization characters, and each of the synchronization characters is separated in time by a random delay interval. First, an activity status is determined for the shared bus in terms of the number of stations that are currently active on the bus. The number of synchronization characters is then adjusted according to the bus activity status. The activity status is also utilized as a dynamic adjustment parameter for the random delay interval that includes a fixed delay term, D, added to a randomly determined delay increment, d. In this manner the message preamble specification is optimized according to real-time network demands, such that latency and data collisions are minimized.

20 Claims, 5 Drawing Sheets

DYNAMIC PREAMBLE CONFIGURATION ON A SHARED BUS

BACKGROUND OF THE INVENTION

1. Technical Field

The present invention relates in general to shared data transmission media and, in particular, to a method and system for optimizing bus access contention. Still more particularly, the present invention relates to tracking the number of activated stations on a shared bus, and dynamically adjusting data transmission preamble parameters in response thereto.

2. Description of the Related Art

Local-Area Networks (LANs), such as Ethernet and Token Ring, are used to transfer data among different end users. Use of these networks requires a concentrator to connect end users to the network in an efficient manner in an office environment. Cost for such connections range from $50 for Ethernet connections to $125 for Token Ring connections. For a low data transfer rate system management bus interconnection among servers that requires lower data transfer rates than typical LANs, the above-stated cost is prohibitively high.

Serial Data Transfer

A low-cost, high-reliability solution for system management architecture requiring low data transfer rates is serial data transfer. Serial data transfer is a form of data output that utilizes a digital communication interface for sending and receiving data in digital format. Serial data transfer is becoming a common method of transferring and collecting low volume data because it provides a reliable and fully standardized link between a transmitter and receiver. Any two devices equipped with a serial data interface can communicate with one another. A serial data interface also provides bi-directional communication so that operating parameters of a connected device can be remotely programmed by a host device. Another significant advantage of differential serial data transfer is that it is highly resistant to electrical noise.

Serial data interfaces are very versatile. Serial data that is sent and received between a sensor and host can be configured in a variety of ways. The Institute of Electrical and Electronics Engineers (IEEE) Recommended Standard 232 (RS-232) and Recommended Standard 422 (RS-422) are two standard serial data communication protocols that are widely utilized. The RS-232 protocol specifies that data is sent over a single wire utilizing voltage levels that vary between +12 volts and −12 volts with respect to a common ground. The maximum cable length for this protocol depends on the properties of the cable and the data transfer rate, but, 50 feet is the generally accepted maximum length. The maximum data transfer rate for RS-232 is typically 56,000 bits per second (bps).

The RS-422 protocol was designed to allow the use of longer cabling and faster data transfer rates. To achieve these improvements, differential voltages are utilized for transmitting data. Two wires (in addition to a ground wire) maintain differentially opposed voltages of +12 volts and −12 volts. Thus, if a noise spike occurs on one of the two data transmission wires, the noise spike will be overlooked because it is not accompanied by a corresponding inverse voltage on the opposing wire. Implementing the differential voltage technique of RS-422 permits utilization of cables with lengths of up to several hundred meters, and data rates exceeding 1 Mbps.

IEEE RS-485

A commonly utilized variation of RS-422 is the RS-485 protocol. RS-485 protocol utilizes the same two-wire differential voltage driving technique as RS-422, but RS-485 protocol also specifies that multiple devices can be connected to form an RS-485 architecture network. Computer systems management systems such as networked servers, may thus utilize an RS-485 architecture for networking non-data traffic nodes such as service processors within a network of servers (See FIG. 1). In the case of a service processor network application, RS-485 allows a single host (primary service processor) to monitor and coordinate more that one secondary service processor utilizing a single cable that branches off to each server in the network.

Shared Bus Contention

Today, a number of bus interfaces utilize collision detection as a method of determining when a bus is busy or when two stations have started a transmission simultaneously. This is true for Ethernet adapters and for serial networks that utilize the RS-485 protocol. When a collision is detected or when a station waiting to transmit a message "sees" a message transmitted on the bus, that station backs off a random amount of time before it can start a new transmission.

The protocol for sending data on the RS-485 interface is similar to Ethernet's collision avoidance technique. The sending station listens for activity on the RS-485 interface. If there is activity, the sending station starts a randomized timer. When the timer expires, the sending station restarts the sending sequence. If there is no activity on the bus, the sending station sends a preamble of synchronization characters and "listens" for these same characters. If the received characters are not the same as the transmitted characters, a collision has occurred and the sending stations must retransmit the message after a random amount of time. This protocol operates efficiently in an Ethernet environment that provides concentrators for signal retransmission.

For economic reasons, many RS-485 system management configurations do not utilize concentrators. Given the extended length of RS-485 cabling signal power diminishes as the signals travel further along the bus structure. A transmitting station's signals can overpower a weaker signal from a distant station resulting in an undetected collision. To avoid this problem a message preamble consisting of a series of synchronization (sync) characters is delivered prior to each data transfer. Random time intervals are inserted between each of the sync characters. The resulting effect is that two stations transmitting at the same time are able to detect the other station's signals even though the first or subsequent character transmission occur at the same time.

Figure 3:
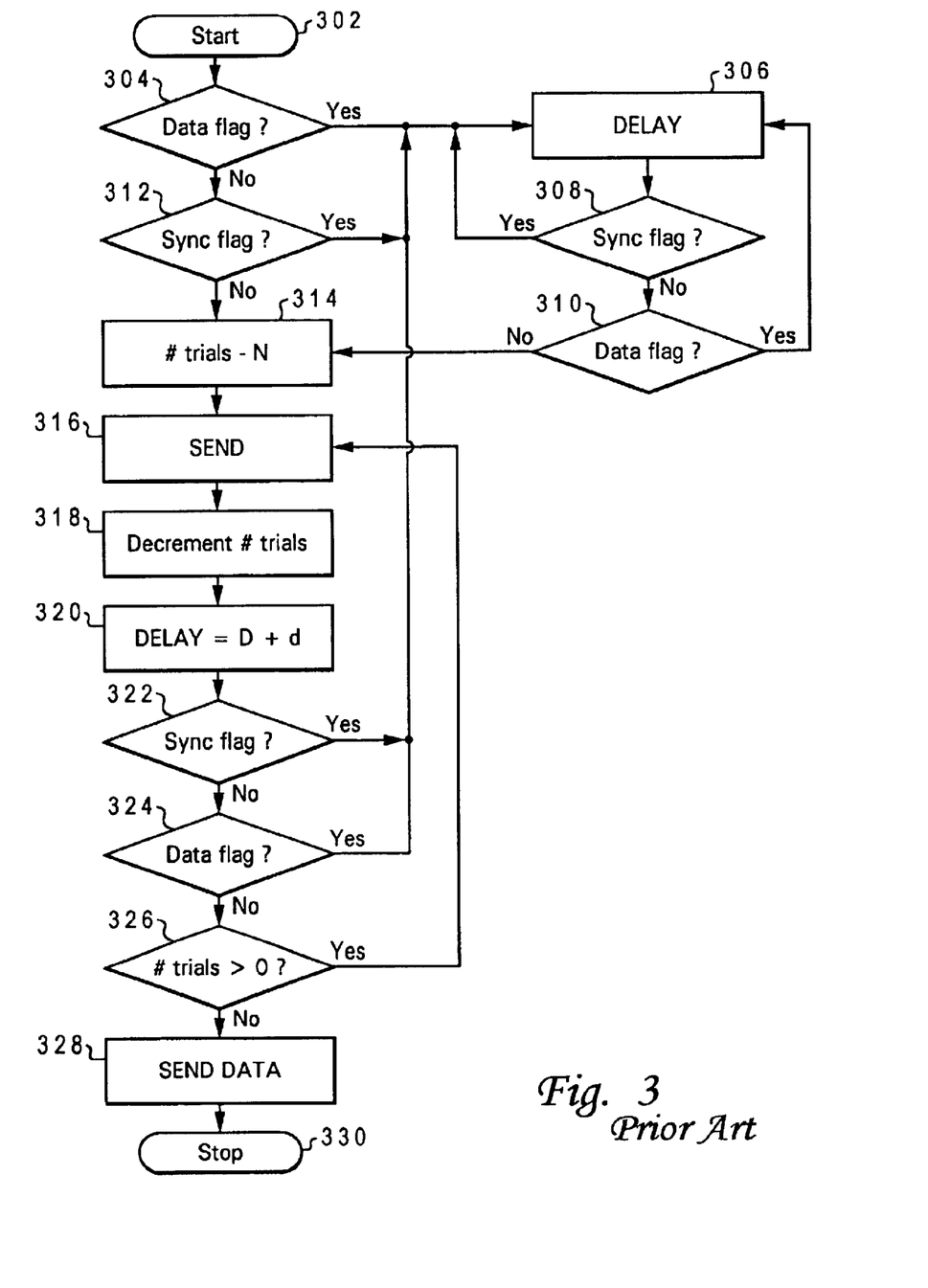
FIG. 3 is a logic flow diagram depicting the steps performed during a conventional data transmission on a shared bus.

FIG. 3 is a flow diagram depicting a conventional message transmission technique upon which the present invention improves. As shown at steps 302, 304, and 306, a message transmission attempt begins with the station listening for either a data or sync flag on the shared bus. In response to determining that another station is currently transmitting either a sync character or data, and as illustrated at step 306, a pre-determined delay is imposed upon the preamble assembly process. Steps 308 and 310 show the repetition of such delays until the station determines that no active transmission of any kind is occurring on the shared bus.

Upon determining that no active transmissions are currently being performed on the shared bus a message preamble transmission sequence is performed as illustrated at steps 316 through 330. A number of synchronization trials, N, as shown at step 314, is a pre-set constant. Under conventional random delay interval practice, a delay factor is generated by adding a randomly selected increment value, d, to a constant time interval value, D. It should be noted that although the randomized selection of d (step 320) must occur as depicted within the preamble transmission sequence, the determination of values for N (step 316) and D (step 320) are sequence independent.

As depicted in FIG. 3, a program loop which is depicted by steps 316 through 326, transmits synchronization characters, inserts a random delay between them, and also listens for other data transmissions on the bus. This loop is completed N times and then the message is transmitted to the RS-485 interface. While the system shown in FIG. 3 is inexpensive to implement (all collision detection is done is software and the hardware is not affected), it imposes a choice between two forms of latency. By setting a fixed number of sync characters excessive latency will be introduced as the direct result of unnecessarily lengthy preamble sequences or as the result of excessive detected or undetected data collisions due to an inadequate number of sync characters.

It can therefore be appreciated that a need exists for a method and system for dynamically adjusting message preamble parameters in accordance with actual system needs, such that network bandwidth is improved while maintaining a low collision rate.

SUMMARY OF THE INVENTION

A method and system for adjusting a message preamble on a shared bus are disclosed, wherein the message preamble includes N synchronization characters, and each of the synchronization characters is separated in time by a random delay interval. First, an activity status is determined for the shared bus in terms of the number of stations that are currently active on the bus. The number of synchronization characters is then adjusted according to the bus activity status. The activity status is also utilized as a dynamic adjustment parameter for the random delay interval that includes a fixed delay term, D, added to a randomly determined delay increment, d. In this manner the message preamble specification is optimized according to real-time network demands, such that latency and data collisions are minimized.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
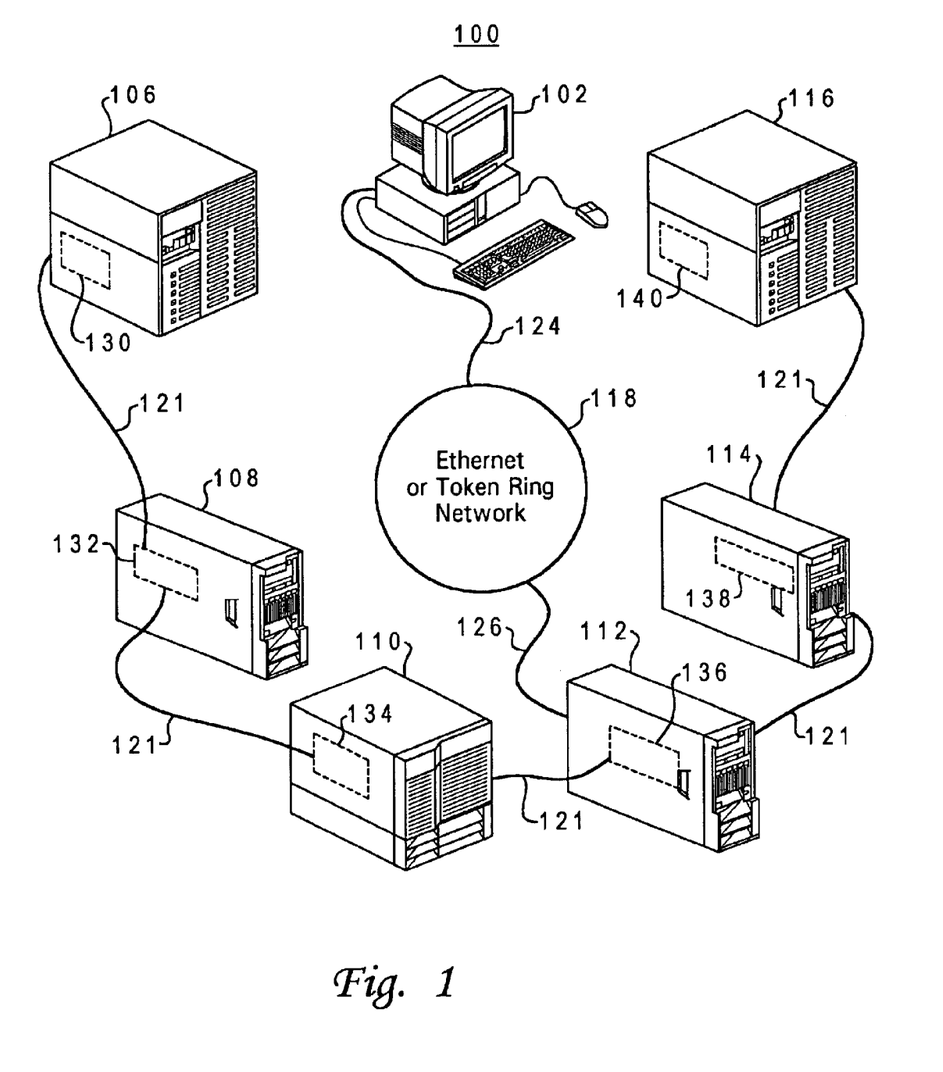
FIG. 1 depicts an illustrative embodiment of a shared bus interconnection system in which a method and system of the present invention may advantageously be utilized.

Referring now to the figures, wherein like reference numerals refer to like and corresponding parts throughout, and in particular with reference to FIG. 1, there is depicted an illustrative embodiment of a shared bus interconnection system 100 in which a method and system of the present invention may advantageously be utilized. As shown in FIG. 1, shared bus interconnection system 100 includes multiple stations 102, 106, 108, 110, 112, 114 and 116. In the depicted embodiment, station 102 is an overall system management station within which an application program (not depicted) correlates all system management data from all stations attached to the LAN. As further illustrated, each of the aforementioned stations includes a service processor (130, 132, 134, 136, 138, and 140, respectively) for managing system startup and other system control and monitoring functions. The service processors are connected together in a daisy-chain configuration utilizing a serial bus interface 121.

As further depicted in FIG. 1, shared bus interconnection system 100 includes a Local-Area Network (LAN) 118 which connects station 102 via local LAN connections 124 and 126. LAN 118 may be an Ethernet or Token Ring network comprising a group of computers and other communication devices. In contrast to serial bus interface 121, LAN connections 124 and 126 are attached to concentrators (not depicted) that are utilized throughout LAN 118 to maintain signal strength among end-users. In contrast, serial bus interface 121 has no concentrators and therefore carries signals having widely varying signal strengths.

With respect to serial bus interface 121, a "collision" results when two or more stations transmit signals at the same time. Collision detection occurs when one of the stations detects the garbled result of a "true" collision, or a signal that a sending station did not itself deliver. As utilized hereinafter, a "true" collision will be utilized to refer to an event in which two signals actually collide on a shared bus. In contrast, "collision" will be utilized hereinafter to refer to an event in which a station detects a signal other than its own while it is transmitting. Since concentrators are not utilized within serial bus interface 121, as signals travel further along the shared bus structure, signal power diminishes. A transmitting station's signals may overpower a weaker signal from a distant station resulting in an undetected true collision.

For purposes of explanation, and as described in further detail with reference to FIG. 2, it will be assumed that signals delivered by station 106 are substantially attenuated before reaching station 116 on serial bus interface 121, such that a true collision between data or sync signals delivered stations 106 and 116 are undetectable by either station. In a preferred embodiment of the present invention serial bus interface 121 is an RS-485 interface.

Figure 2:
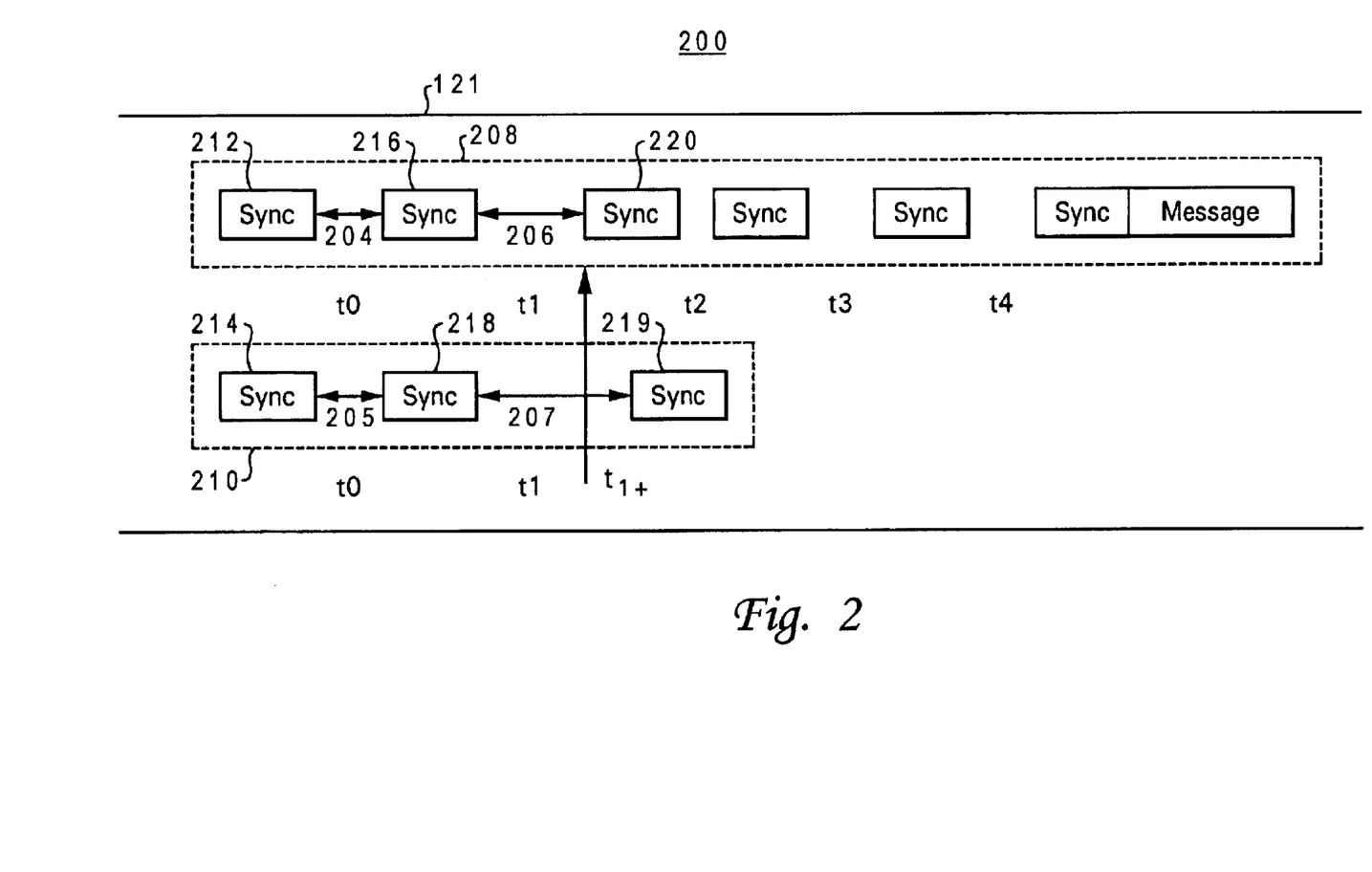
FIG. 2 is a block diagram illustrating a message preamble timing sequence with which a method and system of the present invention may advantageously be utilized.

Turning to FIG. 2, there is presented a block diagram illustrating a message preamble timing sequence 200 within serial bus interface 121 with which a method and system of the present invention may advantageously be utilized. As shown in FIG. 2, shared bus is carrying a signal stream 208 that was sent by station 116 and a signal stream 210 that was sent by station 106.

Each of signal streams 208 and 210 includes message preambles comprising multiple sync characters. The message preamble for signal stream 208 includes leading sync characters 212, 216, and 220 separated by variable time intervals 204 and 206. Similarly, signal stream 210 includes a message preamble comprising leading sync characters 214, 218, and 219 separated by time intervals 205 and 207.

It should be noted that the sync characters carried by serial bus interface 121 are depicted in a time sequence starting from time $t_0$ to $t_4$. As illustrated in FIG. 2, sync characters 214 and 212 both occur on serial bus interface 121 at time $t_0$, resulting in a true collision. Similarly, sync characters 218 and 216 are transmitted simultaneously at time $t_1$, again resulting in a true collision. Due to the distance between originating stations 106 and 116, it is possible that one or neither of these true collisions will be detected by either station. To alleviate this problem, the number of sync characters and the variance in random time interval between sequential sync characters is determined such that data collisions are minimized. This method of detecting a collision between signal streams that are temporarily in "lockstep" is illustrated in FIG. 2 at time $t_{1+}$ at which sync character 220 from signal stream 208 in unmasked by a signal within signal stream 210 and is therefore detectable by station 106 which responds by halting further transmission during a delay period as described in further detail with reference to FIG. 4.

In the manner illustrated in FIG. 2, detection of another station's transmission is guaranteed by the randomized period between transmissions. Since each station has a different time period between character transmission, one station is guaranteed to be transmitting at the same time the other is receiving. If one station detects another station's signals, a "collision" has occurred and one transmitting station stops transmitting for a specified period of time.

Figure 4:
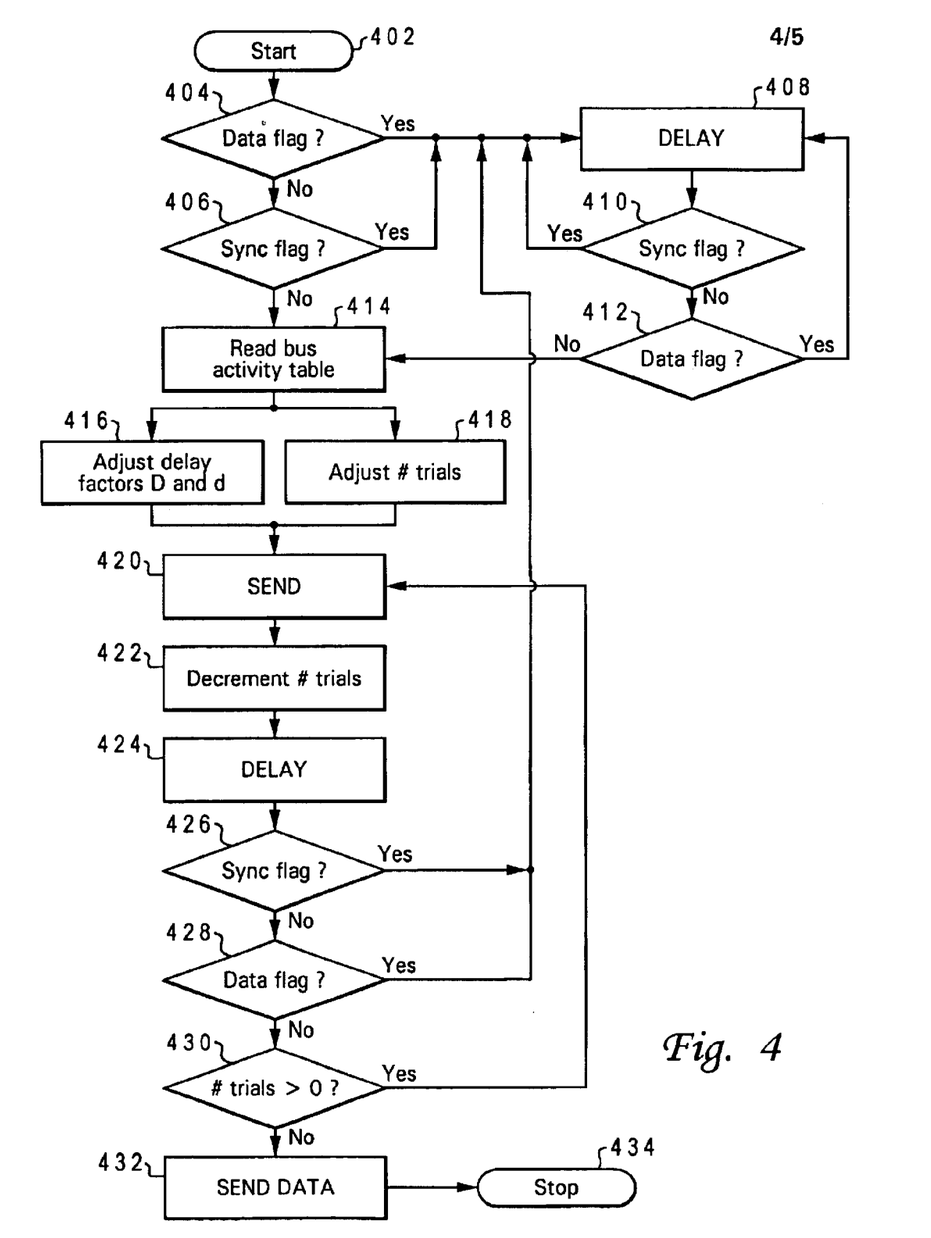
FIG. 4 is a logic flow diagram illustrating method steps performed during a data transmission sequence in accordance with a preferred embodiment of the present invention.

Turning now to FIG. 4, there is depicted a logic flow so diagram illustrating the steps performed during a data transmission sequence from a prospective sending station on serial bus interface 121 in accordance with a preferred embodiment of the present invention. A data transmission attempt commences as shown at step 402 and proceeds to inquiry step 404 that depicts a determination by the prospective sending station of whether data is currently being transmitted on serial bus interface 121. In the depicted embodiment, a "data flag" within the prospective sending station signals detection of data on serial bus interface 121. Similarly, a "sync flag," as shown at step 406, is raised by the sending station in response to detecting a synchronization (sync) character that is part of another station's communication transmission preamble.

As illustrated at steps 404, 406, and 408, in response detecting data or sync characters on serial bus interface 121, the transmission sequence for the prospective sending station proceeds to a delay loop. As shown by steps 408, 410, and 412, the prospective sending station delays continuation of the data transmission sequence until neither data nor sync characters are present on serial bus interface 121.

Proceeding from the delay loop, the data transmission sequence resumes at step 414 which depicts the sending station reading a bus activity table. In a preferred embodiment, the bus activity table is a data handling device for computing and storing preamble parameters such as the number of sync characters, N, the fixed delay, D, between each sync character, and the randomized delay, d, added to D. As explained in greater detail with reference to FIG. 5, several correlation factors are maintained within each station for adjusting the above-mentioned preamble parameters in accordance with the activity of serial bus interface 121.

The current bus activity, as measured by the number of active stations on serial bus interface 121, is utilized as the guidepost in adjusting the message preamble that will be delivered as illustrated at steps 420 through 434. In the preferred embodiment depicted in FIG. 4, two preamble parameters, the number of sync characters (equivalent to number of "trials"), N, and the fixed delay factor, D, between sync characters are dynamically adjusted just prior to transmitting the preamble.

The timespan between each sync character is made up of fixed delay D to which a randomized delay, d, is added to avoid undetected collisions resulting from one or more stations transmitting in "lockstep." As shown at steps 416 and 418, the fixed delay parameter, D, as well as the number of sync characters (equal to the number of "trials"), N, is adjusted according to the current bus activity parameters as read from the bus activity table. Statistical data may be utilized to determine correlation factors which provide a mapping from the number of active stations to the preamble parameters N and D. As explained with reference to FIG. 5, d is selected from a time interval, $\Delta t$, having a duration (0–5 ms, for example). In accordance with an alternate embodiment of the present invention, $\Delta t$ may also be adjusted in accordance with the current number of active stations on serial bus interface 121 as read at step 414.

The data transmission sequence proceeds as illustrated by steps 420 through 434 with the step-wise delivery of the preamble comprising N sync characters each separated by a random delay interval equal to D+d. If, as shown at steps 426 and 428 another transmission is detected on serial bus interface 121 before all N sync characters have been sent, the data transmission sequence will return to the delay loop and another preamble will be generated thereafter. The method steps performed as illustrated by FIG. 4 thus provide for real-time adaptation of the preamble to minimize latency and maximize throughput on serial bus interface 121.

Figure 5:
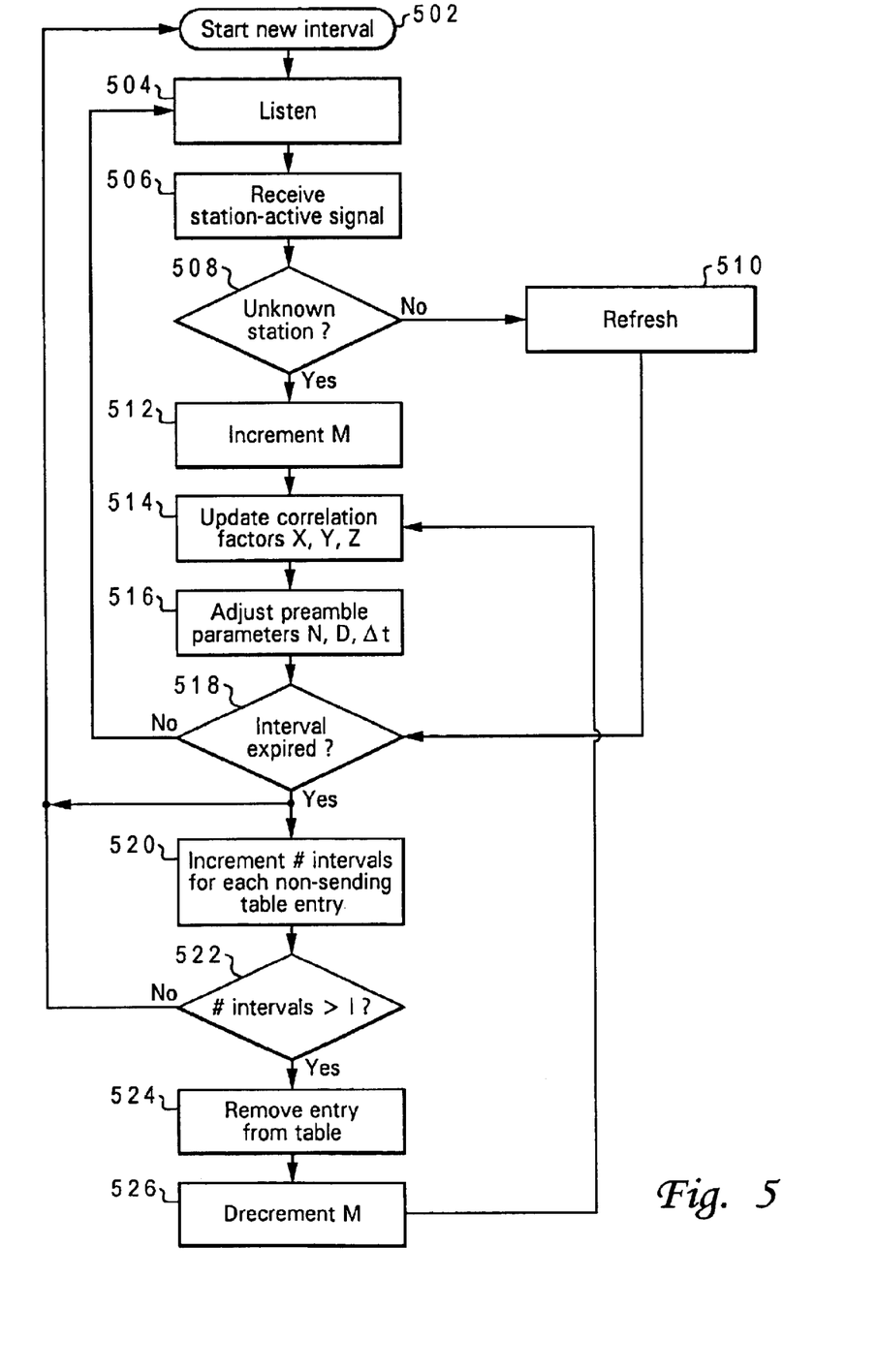
FIG. 5 is a logic flow diagram depicting the steps for dynamically adjusting preamble parameters in accordance with a preferred embodiment of the present invention.

FIG. 5 is a logic flow diagram depicting the steps for dynamically adjusting preamble parameters in accordance with a preferred embodiment of the present invention. The preamble adjustment steps depicted by FIG. 5 are performed concurrently with the data transmission steps performed by a prospective sending station as shown in FIG. 4. In a preferred embodiment, all stations connected to serial bus interface 121 perform the preamble configuration steps shown in FIG. 5 regardless of whether a data transmission is imminent. Step 502 depicts commencement of a preamble configuration interval. The length of this interval should be determined to maximize preamble optimization while minimize data processing and bandwidth overhead and may range from a few seconds to minutes.

During each of such intervals, each station on serial bus interface 121 sends an active station control ("HERE_I_AM") message to indicate its presence to the network in accordance with a predetermined encoding scheme. Included within the active station control message is a station identifier that may be in the form a header or a flag. As depicted at step 504, the station mode is set to "listen" for the active station control message from each active station. Proceeding to step 508, upon receipt of an active station control message, the receiving station determines whether the station is currently inactive, and therefore "unknown" in accordance with its own bus activity table. If so, and as shown at step 510, the pertinent entry within the bus activity table "active stations" list is refreshed and thus verified as remaining active.

Although not expressly depicted in FIG. 5, a new entry is made within the active stations list in response to receiving an active station control signal from a previously inactive, or "unknown", station. As shown at steps 512 and 514, a receiving station updates three correlation factors X, Y, and Z in response to detecting a newly activated station. For each possible value of M, pre-determined numeric correlation values, $X_M$, $Y_M$, and $Z_M$, selected as the currently valid correlation values within the bus activity table by which preamble parameters N, D, and Δt are adjusted as illustrated at step 516.

In a preferred embodiment, updated correlation factor, $X_M$, is an empirically-determined numeric factor associated with an activity level wherein the number of active stations is equal to M. $X_M$ thus provides a one-to-one mapping from each value of M to a corresponding number of required sync characters, N. Similarly, $Y_M$ and $Z_M$ are numeric correlation factors such that the fixed delay factor D and the time range Δt from which the randomized delay factor d is selected, are determined in accordance with one-to-one mappings that $Y_M$ and $Z_M$ provide between M and D and Δt, respectively.

Upon performance of step 516, the receiving station is ready to transmit a message on serial bus interface 121 utilizing an optimized message preamble. Proceeding to inquiry step 518, there is depicted a determination of whether the current interval has expired. If not, steps 504 through 518 are repeated. Upon expiration of the preamble adjustment interval, a new interval is commenced.

As illustrated by steps 520 through 526, if an active station control message is not received within a pre-determined number, I, of intervals from a station currently listed as active, then its entry is removed from the bus activity tables of all attached stations. It should be noted that synchronization among the bus activity tables within each station is not a requirement. The technique illustrated by FIG. 5 is self-adjusting over a short period so that significant performance or latency is not lost if one station deletes its entry prior to another.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described in association with FIGS. 2, 4, and 5 can be accomplished with a computer-aided device. In such a method, data stored in a memory unit of a data-processing system such as a data-processing system, can represent steps in a method for implementing a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for adjusting the length of a message preamble during data transmissions among a plurality of stations connected to a shared bus, said method comprising:
   determining an activity status on said shared bus by ascertaining a number of currently active stations, M, from among said plurality of stations connected to said shared bus; and
   dynamically adjusting a number of synchronization characters, N, within a message preamble according to said determined activity status on said shared bus such that latency and data collisions on said shared bus are minimized.

2. The method of claim 1, wherein said determining further includes:
   retrieving active station control signals from said determined active stations during a fixed time interval;
   storing said retrieved active station control signals as M within a bus activity table; and
   reading M from said bus activity table.

3. The method of claim 1, wherein said dynamically adjusting further includes:
   increasing N in response to a determination that M has increased; and
   decreasing N in response to a determination that M has decreased.

4. The method of claim 1, wherein each of said N synchronization characters is separated in time by a random delay interval, and wherein said random delay interval includes a fixed delay term, D, added to a random delay increment which is randomly selected from a time range, t, wherein said method further includes adjusting D according to said determined activity status on said shared bus.

5. The method of claim 4, wherein said plurality of stations further includes a first correlation table that includes a correlation factor, Y, that provides a one-to-one mapping from each value of M to each value of D, and wherein said adjusting D further includes determining D in accordance with M and Y.

6. The method of claim 4, wherein said method further includes adjusting t according to said determined activity status on said shared bus.

7. The method of claim 6, wherein said plurality of stations further includes a second correlation table that includes a correlation factor, Z, that provides a one-to-one mapping from each value of M to each value of t, and wherein said adjusting t further includes determining t in accordance with M and Z.

8. The method of claim 1, wherein each of said plurality of stations includes a third correlation table in which a correlation factor, X, is stored and updated, and wherein X provides a one-to-one mapping from each value of M to each value of N, and wherein said dynamically adjusting further includes determining N in accordance with M and X.

9. The method of claim 8, wherein said method further includes updating M at a fixed time interval.

10. The method of claim 9, wherein said plurality of stations includes a primary station and at least one secondary station, and wherein said updating M at a fixed time interval further includes:
    delivering an active status message from said at least one secondary station to said primary station at the beginning of each fixed time interval;

determining M within said primary station in accordance with the number of active status messages received by said primary station during said delivering; and in response to said determined M within said primary station, delivering M to said at least one secondary station within said fixed time interval.

11. An apparatus for adjusting the length of a message preamble during data transmissions among a plurality of stations connected to a shared bus, said apparatus comprising:

processing means for determining an activity status on said shared bus by ascertaining a number of currently active stations, M, from among said plurality of stations connected to said shared bus; and processing means for dynamically adjusting a number of synchronization characters, N, within a message preamble according to said determined activity status on said shared bus such that latency and data collisions on said shared bus are minimized.

12. The apparatus of claim 11, wherein said processing means for determining further includes:

processing means for retrieving active station control signals from said determined active stations during a fixed time interval;

processing means for storing said retrieved active station control signals as M within a bus activity table; and processing means for reading M from said bus activity table.

13. The apparatus of claim 11, wherein said processing means for dynamically adjusting further includes:

processing means for increasing N in response to a determination that M has increased; and processing means for decreasing N in response to a determination that M has decreased.

14. The apparatus of claim 11, wherein each of said N synchronization characters is separated in time by a random delay interval, and wherein said random delay interval includes a fixed delay term, D, added to a random delay increment which is randomly selected from a time range, t, wherein said apparatus further includes processing means for adjusting D according to said determined activity status on said shared bus.

15. The apparatus of claim 14, wherein said plurality of stations further includes a first correlation table that includes a correlation factor, Y, that provides a one-to-one mapping from each value of M to each value of D, and wherein said processing means for adjusting D according to said activity status further includes processing means for determining D in accordance with M and Y.

16. The apparatus of claim 14, wherein said apparatus further includes processing means for adjusting t according to said determined activity status on said shared bus.

17. The apparatus of claim 16, wherein said plurality of stations further includes a second correlation table that includes a correlation factor, Z, which provides a one-to-one mapping from each value of M to each value of t, and wherein said processing means for adjusting t further includes processing means for determining t in accordance with M and Z.

18. The apparatus of claim 11, wherein each of said plurality of stations includes a third correlation table in which a correlation factor, X, is stored and updated, and wherein X provides one-to-one mapping from each value of M to each value of N, and wherein said processing means for dynamically adjusting N according to said activity status on said shared bus further includes processing means for determining N in accordance with M and X.

19. The apparatus of claim 18, wherein said apparatus further includes processing means for updating M at a fixed time interval.

20. The apparatus of claim 19, wherein said plurality of stations includes a primary station and at least one secondary station, and wherein said processing means for updating M at a fixed time interval further includes:

processing means for delivering an active status message from said at least one secondary station to said primary station at the beginning of each fixed time interval;

processing means for determining M within said primary station in accordance with the number of active status messages received by said primary station during said delivering step; and processing means, responsive to said determined M within said primary station, for delivering M to said at least one secondary station within said fixed time interval.

* * * * *

UNITED STATES PATENT AND TRADEMARK OFFICE
CERTIFICATE OF CORRECTION

PATENT NO. : 6,735,635 B1
APPLICATION NO. : 09/574753
DATED : May 11, 2004
INVENTOR(S) : James William Feeney et al.

It is certified that error appears in the above-identified patent and that said Letters Patent is hereby corrected as shown below:

Title Page, item (75), replace "Jorge R. Rodriquez" with --Jorge R. Rodriguez--

Signed and Sealed this
Twenty-ninth Day of October, 2013

Teresa Stanek Rea
*Deputy Director of the United States Patent and Trademark Office*